United States Patent [19]

Sandor et al.

[11] 4,089,414
[45] May 16, 1978

[54] BASE GUARD FOR DISC MEMORY CARTRIDGE PACK

[75] Inventors: Joseph Sandor, Reseda; Vern Evert Goode, San Jose, both of Calif.

[73] Assignee: Innovative Computer Products, Tarzana, Calif.

[21] Appl. No.: 783,987

[22] Filed: Apr. 4, 1977

[51] Int. Cl.² .................. B65D 85/62; B65D 85/02; G11B 1/02
[52] U.S. Cl. .................. 206/444; 206/303; 206/509; 220/23.6; 360/133
[58] Field of Search ........... 206/444, 309, 312, 303, 206/373, 509; 220/23.6, 85 R; 211/40; 312/10

[56] References Cited

U.S. PATENT DOCUMENTS

| | | | |
|---|---|---|---|
| 2,525,519 | 10/1950 | Breshears et al. | 220/85 R |
| 2,549,440 | 4/1951 | Erro | 220/23.6 |
| 2,649,606 | 8/1953 | Fadner | 206/373 |
| 2,773,727 | 12/1956 | Bradley | 211/40 |
| 2,790,609 | 4/1957 | Hawthorne et al. | 220/23.6 |
| 2,881,004 | 4/1959 | Hahn | 312/10 |
| 3,570,661 | 3/1971 | Kersh | 206/444 |
| 3,635,608 | 1/1972 | Crouch et al. | 206/444 |

*Primary Examiner*—William T. Dixson, Jr.

[57] ABSTRACT

A base guard for use with front loading magnetic disk memory cartridge packs, is made of one piece construction, e.g., injection moulded, and formed to allow for registered, interlocked and nested vertical stacking of the memory cartridge packs and to secure the access door of the memory cartridge packs so as to prevent entry of dust particles. The base guard is formed so as not to interfere with the handle-like recesses or handholds and to prevent damage to and misalignment of the hub structure of the disk pack.

8 Claims, 7 Drawing Figures

U.S. Patent  May 16, 1978  Sheet 3 of 3  4,089,414
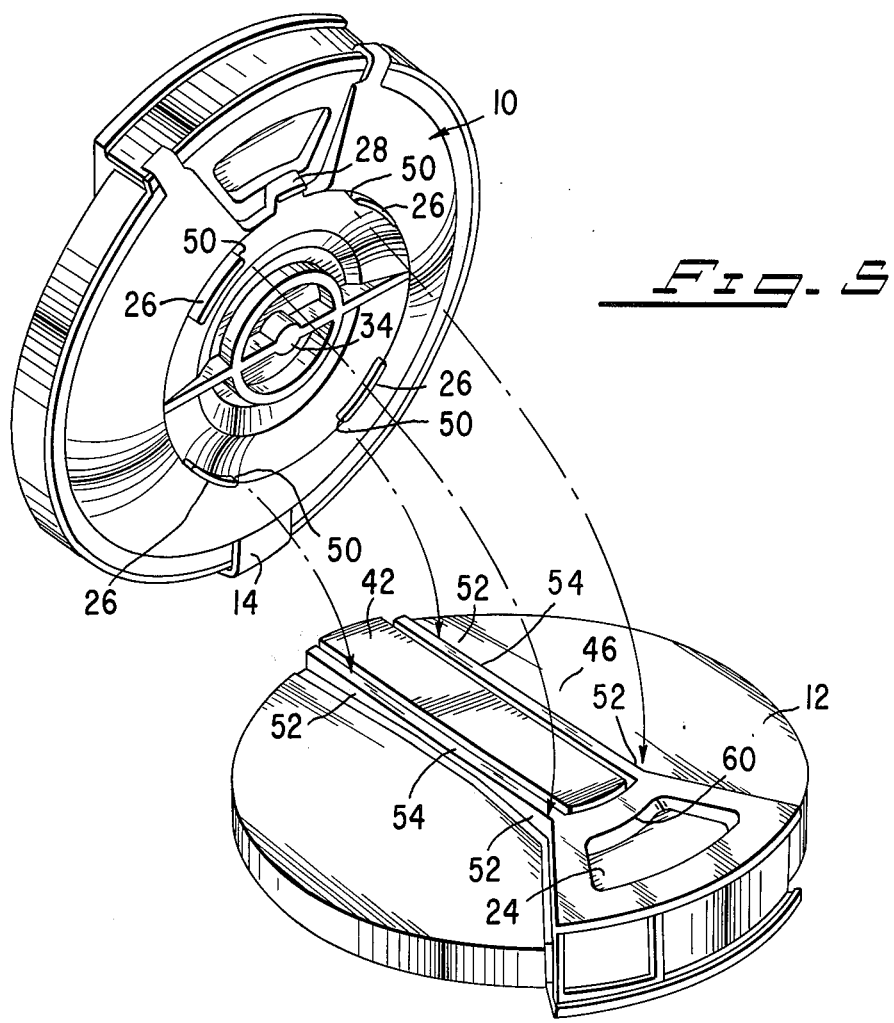
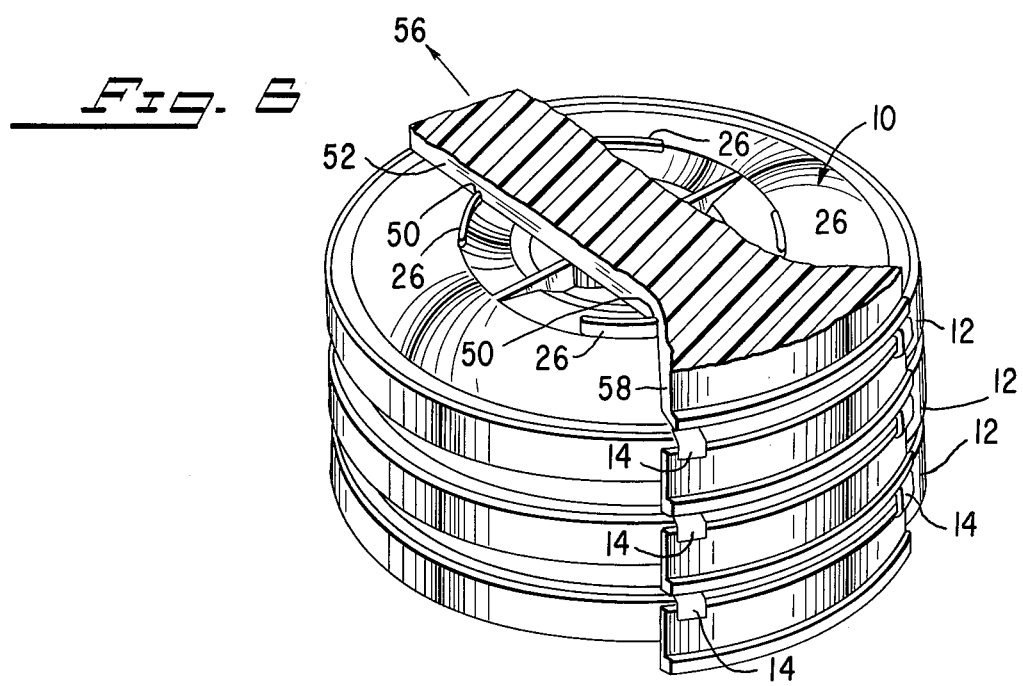

BASE GUARD FOR DISC MEMORY CARTRIDGE PACK

BACKGROUND OF THE INVENTION

1. Field of the Invention

This invention relates to the field of construction and formation of front loading magnetic disk memory cartridge packs used by computers.

2. Description of the Prior Art

Random access disk memories have been used extensively in data processing systems. Such disk memories employ a disk assembly of one or more magnetically coated disks which can be mounted on a drive unit for recording on and reproducing data from the surfaces of the disk or disks. A cartridge, an enclosure or a cover is provided for the disk assembly to facilitate handling and storage, and to protect the surface of the disks during installation and removal from the drive unit. The cartridge prevents human contact with the disk surfaces and seals the disk and disk assembly from airborne contaminants.

Such cartridges are constructed to allow the necessary connections to be made with the drive unit, including the introduction of one or more transducers into close proximity to the disk surface and the attachment of the disk assembly to a drive shaft for rotation of the disk assembly.

Previously, cartridges have been constructed having a removable base cover which can be detached when the base of the cartridge is attached to the drive unit. The base of the cartridge may be rotated by the drive unit with the disk assembly. Another type of cartridge is also known which encloses the disk assembly even when the disk assembly is attached to the drive unit. This type of cartridge is provided with an access door which opens automatically when the cartridge is installed in the drive unit to allow for the insertion of a transducer.

As data densities of cartridges have increased and transducers heads are positioned closer to the disk, system margins are reduced to the point where tolerances in micro-inches must be maintained. In order to maintain these tolerances in the field, the disk and hub within the plastic cartridge must be additionally protected from potential handling and contamination problems. This additional protection is provided by a base guard. The use of a base guard also allows storage of disk cartridges in a vertical position (as opposed to flat storage) without seriously increasing storage hazards.

A representative sample of a base guard is illustrated in U.S. Pat. No. 3,635,608 (element 4). Such a base guard is attached to the disk cartridge by means of magnets which act upon the metal hub of the cartridge to secure the base guard. Such a base guard thus requires at least two steps to make, namely: (1) formation of the plastic guard; and (2) attachment of magnets to the base guard. These prior art base guards cover substantially all of the base surfaces of the disk cartridges. However, most cartridges are constructed to have a recess in their top surface and an opposing complementary recess in the base to serve as a hand hold for the cartridges. Such base guards cover the recess and prevent the functioning of the recess usually provided in the base as a handhold. Other base guards are merely slightly oversized copies of the lower surface of the disk cartridge itself.

What is needed is a base guard, for computer disks cartridges, which is of unitary construction and does not require the fastening of magnets to the base guard to hold the base guard onto the cartridge. There is a further need for a base guard which does not cover the entire base of the cartridge, but rather covers all of the base except the cooperating handhold or recess in the base. In addition, it is desired that the base guard be sufficiently rigid to provide sufficient strength against impact from a direction parallel to the axis of the hub and that such base guard be formed so as to permit vertical, nested, registered and interlocked stacking of cartridges in order to minimize storage space requirements.

BRIEF SUMMARY OF THE INVENTION

The present invention is a protector or base guard for disk cartridges wherein each of the cartridges has a handhold. The present invention comprises a resilient retaining means for removably attaching the protector to the disk cartridge and an indentation configured into the protector to expose the underlying hand hold in the disk cartridge. The invention may further comprise a stacking means for registering and locking the disk cartridge which has the protector attached thereto to a vertically adjacent disk cartridge. The invention may further include an integral reinforcing means for structurally reinforcing and increasing the rigidity of the protector.

In particular the protector may be disk shaped and the resilient retaining means may include at least three integrally formed resilient extensions. Each of the extensions is removably engaged with the disk cartridge by being resiliently deformed about the disk cartridge, such as being snap fit about one of the edges of the disk cartridge. One of the extensions may be snap fit about the access door of the disk cartridge thereby securing the door in a tightly closed configuation. Where the disk cartridge has a raised rectangular projection on its upper surface which terminates in a recess at one end of the rectangular projection, the plurality of projections on the protector may include four vertically extending projections which are arranged and configured to be disposed or juxtapositioned next to the recess in the adjacent disk cartridge. Finally, the reinforcing means of the protector may include a plurality of ribs circumferentially disposed about the center of the protector in the shape of a circle with a line intersecting the circle along a diameter. These and other advantages and embodiments of the present invention may be better understood by considering the detailed description of the preferred embodiments in light of the figures.

BRIEF DESCRIPTION OF THE DRAWINGS

FIG. 5 shows the manner in which the projections of one protector mate with the surfaces on an adjacent disk cartridge.

FIG. 6 shows a plurality of stacked disk cartridges each having a protector attached thereto and shows in fragmented view a portion of one disk cartridge as it engages the projections of an adjacent protector whereby the disk cartridges are registered and locked.

DETAILED DESCRIPTION OF THE PREFERRED EMBODIMENTS

Figure 1:
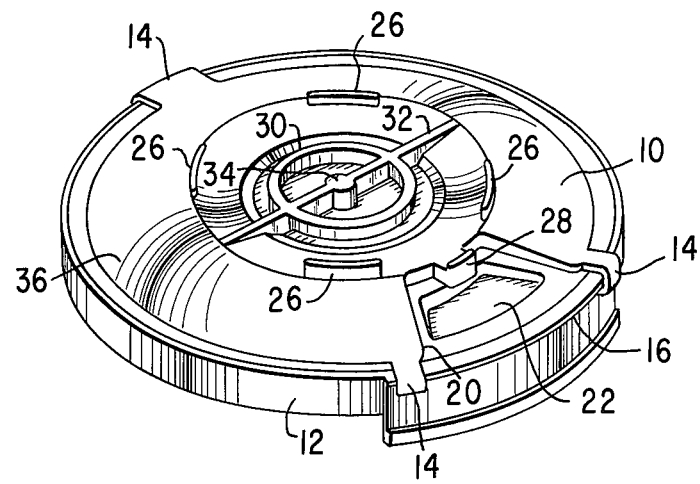
FIG. 1 shows a disk cartridge having a protector or base guard snap fit onto the upper surface of the cartridge.

The base guard of the present invention has been designed to provide maximum protection for disk cartridges. Ease of handling, stacking, durability and appearance have also been incorporated. The base guard protects the disk cartridge, which is susceptible to damage, in the following way: 1. eliminates any shift or movement of the disk-hub assembly, relative to the plastic housing; 2. eliminates damage from any impact directly or indirectly placed on the cone and/or diaphram of the hub; 3. protects the armature plate and inside surfaces of the cone from nicks, dents and scratches; and 4. prevents contaminants such as oil, smoke, etc., from entering the cartridge housing, and prevents them from depositing on the disk surfaces.

The base guard fits tightly on the bottom side of the cartridge, protecting the armature plate, diaphram and cone from damage, while keeping contaminants out. Due to the configuration and fit of the base guard the relative position of the cone to the armature plate is also protected against damage, even under impact higher than that specified in ANSI specifications.

To protect against lateral shift of the disk-hub assembly within the cartridge housing, the cartridge is typically designed with a spring loaded button which holds the disk-hub assembly in place as long as the access door is closed tightly. The base guard will optimize this by holding the access door securely closed, even under severe impact to the cartridge.

The base guard is a safe and positive means of protecting against lateral movement. The base guard uses two studs which seat in the locating recesses of the cartridge housing, and a center cone-shaped stud which seats in the cone of the disk-hub assembly, keeping a constant relationship between cartridge and cover.

Storage of the cartridge is also important. Most manufacturers recommend that they be stored horizontally. With the base guard of the present invention this can be done easily with a minimum amount of space. Up to six cartridges can be safely stacked horizontally because the base guard is made to interlock with the top surface of the cartridge below it.

An important part of protecting the cartridge is handling it properly. Therefore, it is essential that an operator has a firm hold on the cartridge at all times. The cartridge housing has a hand-hold recess as a part of its design. The peripheral contour of the base guard is relieved in this area so that mounting and removal can be done with one hand securely holding the cartridge.

The base guard will outlast the life of several cartridges. It is made of an extremely durable, warp free, heat resistant plastic with a textured finish on outer surface to facilitate handling.

The present invention comprises a disk shaped base guard or protector for vertical stacking of magnetic disk cartridges, wherein each disk cartridge has a handhold. The invention comprises a resilient retaining means, an indentation, and integral stacking means, and an integral reinforcing means. The resilient retaining means is integrally formed with the base guard for temporarily attaching the base guard to the cartridge. The indentation is configured into the base guard to expose the underlying handhold in the cartridge. The integral stacking means registers and locks the cartridge which has a base guard attached thereto to a similar one of such cartridges. Finally, the integral reinforcing means structurally reinforces and increases the rigidity of the base guard. In particular, the retaining means includes at least three brackets wherein each bracket is snap fit over one of the edges of the disk cartridge. The stacking means may also include a plurality of outwardly disposed projections wherein each projection mates with the corresponding projection on an adjacent cartridge.

The structure and function of the present invention may be better understood by considering the illustrated embodiment as shown in each of the figures.

FIG. 1 shows one embodiment of protector or base guard 10 disposed on a conventional magnetic disk cartridge 12. In the illustrated embodiment, base guard 10 has three extensions 14 integrally formed with base guard 10. Two of the extensions 14 are clearly shown as being clipped about one edge 16 of cartridge 12. The opposing extension is similarly clipped about a second edge as is best shown in FIG. 3. As seen in FIG. 1 and as shown in greater clarity in FIG. 2 the extension 14 is generally formed in an "L" shape having a retaining lip 18 which is arranged and configured to mate with or snap fit over a corresponding edge of cartridge 12.

Base guard 10 has a suitable indentation formed on one portion of its circumferental sector. As shown in the present illustration indentation 20 is arranged and configured to circumscribe a handhold, handle or indentation 22 typically found in conventional disk cartridges. Handhold 22 corresponds to a matched handhold 24 on the opposing side of disk cartridge 12. The opposing and matched handholds 22 and 24 permits the user to easily grasp the edge of disk cartridge 12 by inserting the fingers and thumb of one hand into the opposing handholds 22 and 24.

One surface of base guard 10 may have a plurality of projections integrally formed thereon to facilitate registration and interlocking between vertically stacked disk cartridges provided with the base guard of the present invention. In the illustrated embodiment, FIG. 1 shows four segment projections 26 disposed in a generally circular pattern about the center of base guard 10. A fifth upwardly disposed projection 28 is also shown as provided on a spur which extends from the center of base guard 10 into the general area of hand hold 22. As will be described in greater detail below, projections 26 and 28 provide a registration and locking means with respect to the next adjacent disk cartridge which will be disposed upon base guard 10 when vertically stacked as shown in FIG. 4. Base guard 10 may also include a plurality of integally formed ribs which serve to structurally reinforce and increase the rigidity of base guard 10. In the illustrated embodiment, the plurality of ribs are shown as including a generally circular rib 30 formed about the center of base guard 10 which is intersected by a straight rib 32 along a diameter of circular rib 30. The center of base guard 10 may also include a reinforcing pedestal 34 which is intersected by straight rib 32. FIG. 3 shows that straight rib 32 is also continued and integrally formed on the lower portion of base guard 10 which by reason of its beveled circumferential surface 36 forms a three dimensional cover.

Certain additional features of base guard 10 are clearly shown in FIG. 3. Namely, registration projections 38 may be integrally molded to the lower side of base guard 10 and mate with corresponding holes 40 provided in a conventional disk cartridge 12. By inclusion of projections 38, it is impossible to affix base guard 10 to disk cartridge 12 without also correctly positioning extensions 14 over the proper mating surfaces on cartridge 12.

Figure 2:
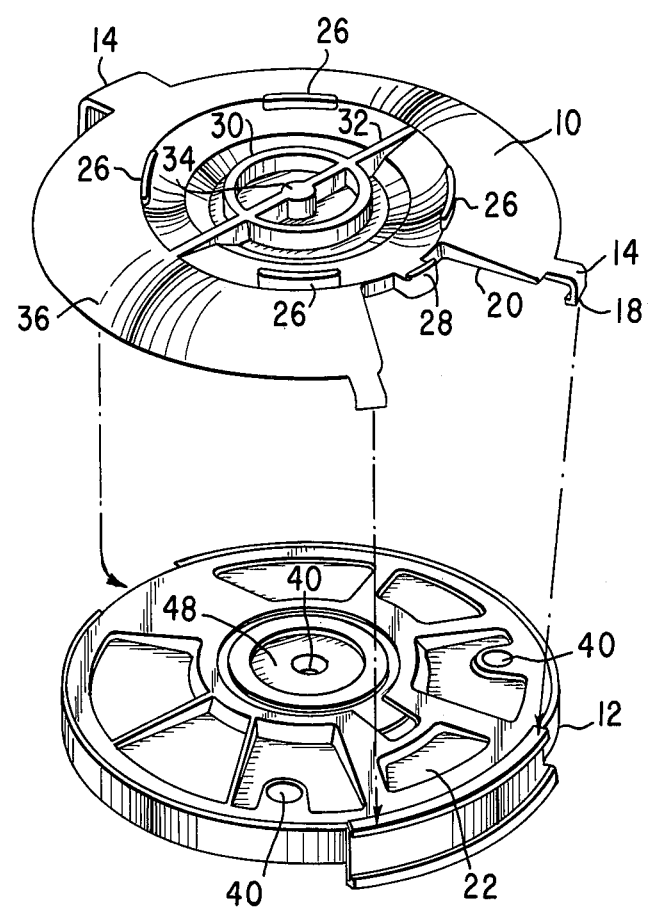
FIG. 2 shows the protector and disk cartridge of FIG. 1 wherein the protector has been removed from the disk cartridge.
Figures 3, 4, 7:
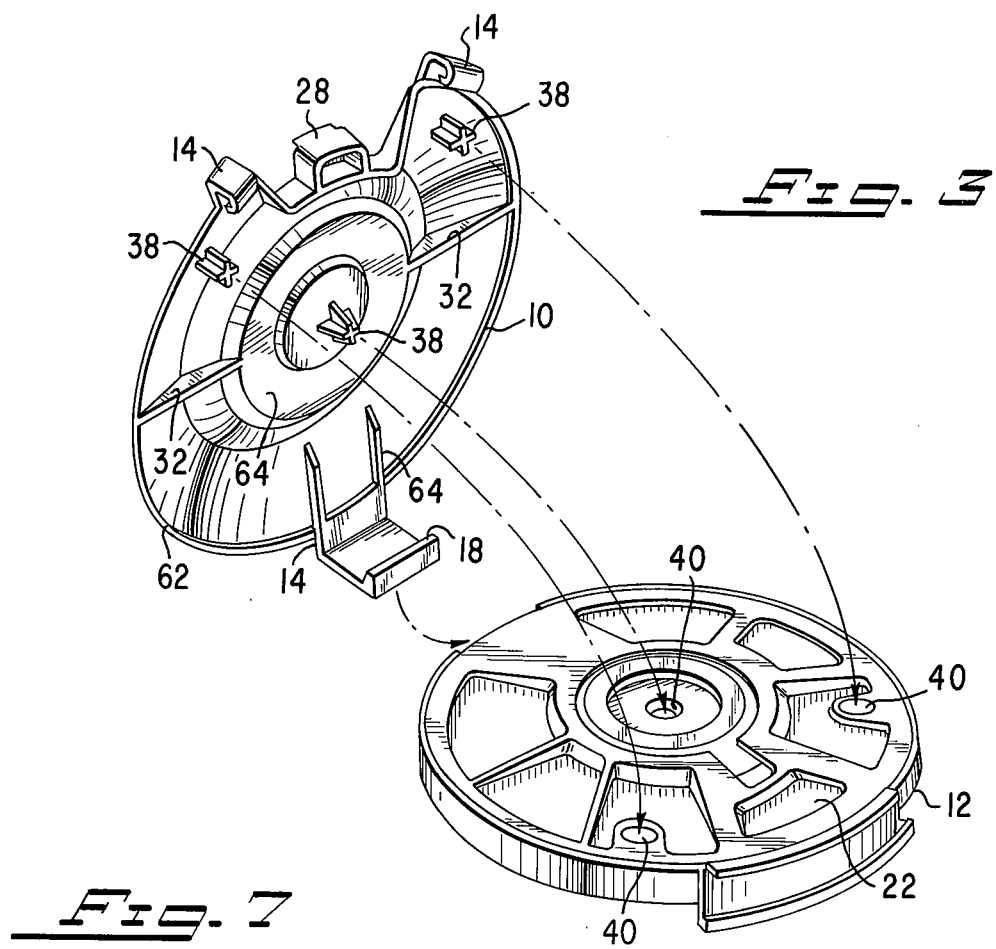
FIG. 3 shows the underside of the protector, clearly showing the three resilient retaining extensions.
FIG. 4 shows a plurality of disk cartridges, each provided with a protector stacked in a vertical fashion according to the present invention.
FIG. 7 shows a partially opened access door which forms part of the horizontal projection on a disk cartridge with which the protector of the present invention is used.

Throughout the present specification it shall be assumed that the surface of base guard 10 shown in FIGS. 1 and 2 is the upper surface and that disk cartridges 12 together with their corresponding base guards 10 are vertically stacked as shown in FIGS. 4 and 6. However, it must be expressly understood that the designation of one side of base guard 10 as the upper surface is entirely arbitrary. Disk cartridges 12 may be stacked in reverse order wherein the lowest disk cartridge may or may not have a base guard 10 attached thereto. It must further be understood that base guard 10 may incorporate the various features of the present invention in a modified form according to the particular design of disk cartridge 12. The disk cartridge illustrated in the present embodiment is chosen only for the purposes of illustration. The illustrated embodiment is of the type in which and access door 42 is provided and which automatically opens when the cartridge is installed in the drive unit unit to allow insertion of an electromagnetic transducer to read or write upon the enclosed magnetic disk. FIG. 7 illustrates a fragmentary view of access door 42 in a partially opened configuration thereby permitting access to magnetic disk 44 contained therein. FIG. 5 best illustrates door access 42 in a closed position and shows its relationship to hand-hold 24 disposed on the opposite side of cartridge 12 from the opening of access door 42. Typically, access door is resiliently retained in a closed configuration by the resiliency of the material from which access door is made. Access door 42 is separated from the remaining portion of disk cartridge 12 back to the approximate point of area 46 wherein it integrally merges with the remaining material of cartridge 12. Through normal use access door 42 will lose some of its resiliency and will not return to a tightly closed configuration. This is a major limitation on the useful life of the disk cartridge and its integrity. The opposing surface of cartridge disk 12 is best illustrated in FIGS. 2 and 3. It will be noted, in particular with respect to FIG. 3, that one of the extensions 14 is arranged to snap fit over access door 42. Therefore, while stored, access door 42 is pressed shut thereby further insuring the integrity of its seal against outside contaminants which might otherwise degrade the quality of magnetic disk 44 and preventing accidental opening of access door 42.

These and other advantages of the present invention together with its operation may now be understood. FIG. 2 illustrates what may be designated as the bottom surface of disk cartridge 12, typically exposing a metallic drive hub 48. Base guard 10 may be snapped fit over the bottom surface of disk cartridge 12 in the manner indicated in FIG. 2 and as shown in FIG. 1. The natural resiliency of extensions 14 allow each of the extensions to bend upwardly and outwardly permitting a lip 18 provided on each extension to fit over a corresponding lip or mating surface on cartridge 12. Two of the extensions 14 are shown in FIG. 1 as snap fitting and locking on the lower edge of disk cartridge 12 (shown as the upper edge in FIG. 1). FIG. 3 shows the opposing extension 14 as having a greater extent so as to permit it to snap fit over the entire width of disk cartridge 10 upon the upper edge of disk cartridge 10, namely access door 42 (the lower edge hidden in FIG. 3). As previously stated, projections 38 provide a means for registering base guard 10 with respect to the lower surface of cartridge 12 so that extensions 14 cannot fail but to be properly aligned with the mating edges and surfaces of cartridge 12. FIGS. 5 and 6 illustrate the function of projections 26 and 28 to serve as a means for registering and locking each cartridge disk 12 to an adjacent cartridge disk when stacked in shown in FIGS. 4 and 6.

Projection 28 and the opposing extension 14 may be considered as defining a midline through pedestal 34 of base guard 10. On each side of this midline, projections 26 form a symmetrical arrangement. The nearest edge 50 of each projection 26 serves as a mating surface which engages the exterior edge 52 which is formed by a shoulder 54 provided on each side of access door 42. This engagement is best shown in FIG. 6 wherein shoulder 54 of the next adjacent cartridge is shown in a cutaway and diagrammatic view. Thus, by means of the cooperation of projections 26 and shoulders 54, rotation of one disk cartridge with respect to the next disk cartridge is prevented.

Projections 28 and 26 similarly prevent translation of one disk cartridge with respect to the other. For example, translation in direction 56 as shown in FIG. 6 is prevented by the juxtaposition of edges 50 of two of of the projections 26 against the flared portion 58 of shoulder 54. Projection 28 prevents translation of the adjacent disk in a direction opposite to that of direction 56. As best shown in FIG. 5, projection 28 has a portion which is juxtapositioned within hand hold 24 next to an inside surface 60 of the recess forming the handhold. Thus, it may now readily be appreciated that projections 26 and 28, integrally molded as part of base guard 10, prevent both the rotation and translation of one disk cartridge 12 with respect to a next adjacent disk cartridge thereby registering and locking each disk cartridge into a vertically stacked array as shown in FIGS. 4 and 6. A typical stacked array of cartridges 12 as would occur in actual use is best illustrated in FIG. 4 wherein each disk cartridge 12 is provided with a base guard 10 which in turn serves as a suitable mounting, registering and locking base for the next adjacent disk cartridge to be positioned thereon.

As can be readily appreciated, when viewing the underside of base guard 10 shown in FIG. 3, that the load upon each base guard 10 is distributed across a wide area of the base guard including projections 38, rib 32, circumferential ring 62 and other flush surfaces 64. As a result, large loads may be widely distributed across the next adjacent disk cartridge to which base guard 10 is attached. A large number of disk cartridges may thus be stacked in a vertical array without causing high stresses to be concentrated at any given point on any of the disk cartridges. Deformation and permanent damage to the cartridges is thus substantially avoided. In addition, each base guard 10 through self-registration and locking produces a rigid and secure array of vertically stacked disk cartridges forming a secure and extremely compact column without the need for additional racks in order to obtain strength and proper support for each cartridge. It must be expressly understood that base guard 10 may be fabricated by any means well known to the art, and in particular is extremely well adapted to injection molding of a semirigid and resilient plastic material. Thus, base guard 10 is particularly noted by its simplicity, low cost, ruggedness, ease of manufacture, compactness, strength, and absence of additional accessories such as magnet used in the prior art to obtain a secure attachment.

Finally, it must also be expressly understood that the present embodiment has been illustrated only for the purposes of clarity and explanation and should not be taken as limiting the extent or scope of the present invention. Many other modifications and alterations may be made by those having ordinary skills in the art to adapt the various elements of the present invention to other applications, including other disk cartridge designs, without departing from the spirit of the present invention.

I claim:

1. A protector for use in stacking magnetic disk cartridges having a raised rectangular projection on its upper surface comprising:
   resilient means for removably attaching said protector to one of said disk cartridges;
   an indentation configured into said protector to expose said underlying handhold in said disk cartridge;
   a plurality of projections on said protector vertically extending from said protector and juxtapositioned outside said rectangular projection on an adjacent magnetic disk cartridge; and
   a vertically extending projection arranged and configured to be disposed in and juxtapositioned next to said handhold in said adjacent magnetic disk cartridge,
   whereby each magnetic disk cartridge is registered and locked with respect to an adjacent one by means of said vertically extending projection and said plurality of projections in combination with said raised rectangular projection of each of said magnetic disk cartridges.

2. The protector of claim 1 further comprising: integral reinforcing means for substantially reinforcing and increasing the rigidity of said protector.

3. The protector of claim 2 wherein said reinforcing means is a plurality of ribs symmetrically disposed about the center of said protector in the shape of a circle with one line intersecting said circle along a diameter.

4. The protector of claim 1 wherein said magnetic disk cartridge has an access door and wherein said protector is disk shaped and said resilient retaining means includes at least three integrally formed resilient extensions, said extensions removably engaging said disk cartridge by being resiliently deformed about said disk cartridge, and at least one of said resilient extensions extended over said access door thereby tending to maintain said door in a closed configuration.

5. The protector of claim 4 wherein said extensions are removably engaged about said disk cartridge by being snap fit thereover.

6. A disked shaped base guard for vertically stacking of magnetic disk cartridges, each having a recessed handhold, comprising:
   resilient retaining means integrally formed with said base guard for temporarily attaching said base guard to said cartridge;
   an indentation configured into said base guard to expose said underlying handhold in said cartridge;
   integral stacking means for registering and locking said cartridge having said base guard attached thereto to another one of said cartridges;
   integral reinforcing means for reinforcing and increasing the rigidity of said base guard;
   wherein said retaining means includes at least three brackets, each bracket being snap fit over one of the edges of said disk cartridge, and
   wherein said stacking means includes a plurality of outwardly disposed projections, each projection mating with a corresponding recess on an adjacent one of said cartridges, said projections including at least four vertically extending projection arranged and configured to be juxtapositioned outside a rectangular raised portion on said adjacent disk cartridge and including a vertically extending projection arranged and configured to be disposed in and juxtapositioned next to said recessed handhold.

7. A protector for use in horizontally stacking magnetic disk cartridges having a raised rectangular portion on an upper surface thereof and having a recessed handhold said protector including
   a plurality of projections on said protector vertically extending from said protector and juxtapositioned to be outside said rectangular portion on an adjacent disk cartridge; and
   a vertically extending projection arranged and configured to be disposed in and juxtapositioned next to said recessed handhold in said adjacent disk cartridge.

8. A protector for use in horizontally stacking a plurality of magnetic disk cartridges having a handhold comprising:
   resilient means for removably attaching said protector to one of said disk cartridges;
   an indentation configured into said protector to expose said underlying handhold in said disk cartridge;
   stacking means for registering and locking said disk cartridge attached to said protector, said registration being with respect to a vertically adjacent disk cartridge;
   wherein said protector attaches to the lower surface of said disk cartridge, wherein said stacking means includes a plurality of outwardly extending integral projections from said protector, each said projection arranged and configured to be disposed in a corresponding recess of the upper surface of an adjacent one of said plurality of disk cartridges, wherein said disk cartridge has a raised rectangular portion on its upper surface terminating in a portion of said recessed handhold at one end of said rectangular portion, and wherein said plurality of projections on said protector includes at least four vertically extending projections arranged and configured to be juxtapositioned outside said rectangular portion on said adjacent disk cartridge and includes a vertically extending projection arranged and configured to be disposed in and juxtapositioned next to said recess.

* * * * *